J. A. BRENT, Jr.
COTTON PLANTING ATTACHMENTS FOR HARROWS.
No. 179,996. Patented July 18, 1876.
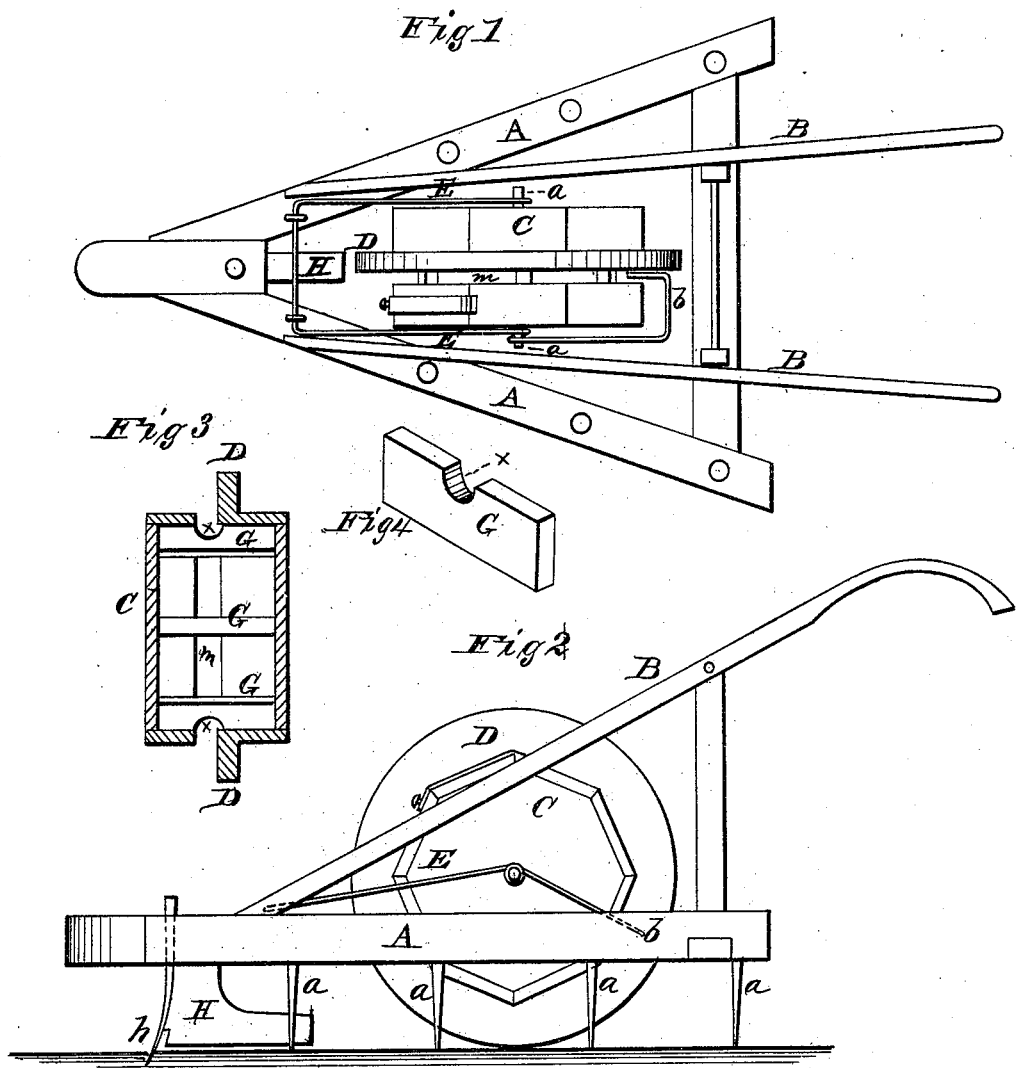

UNITED STATES PATENT OFFICE.

JAMES A. BRENT, JR., OF CRYSTAL SPRINGS, MISSISSIPPI, ASSIGNOR OF ONE-THIRD HIS RIGHT TO WM. J. COVINGTON, OF SAME PLACE.

IMPROVEMENT IN COTTON-PLANTING ATTACHMENTS FOR HARROWS.

Specification forming part of Letters Patent No. 179,996, dated July 18, 1876; application filed May 26, 1876.

*To all whom it may concern:*

Be it known that I, JAS. A. BRENT, Jr., of Crystal Springs, in the county of Copiah, and in the State of Mississippi, have invented certain new and useful Improvements in Cotton-Planting Attachments for Harrows; and do hereby declare that the following is a full, clear, and exact description thereof, reference being had to the accompanying drawings, and to the letters of reference marked thereon, making a part of this specification.

The nature of my invention consists in the construction of cotton-planting attachments for harrows, as hereinafter more fully set forth.

In order to enable others skilled in the art to which my invention appertains, I will now proceed to describe my invention, reference being had to the accompanying drawings, forming a part of this specification, in which—

Figure 1 represents a plan view. Fig. 2 represents a side elevation. Fig. 3 represents a section taken through the seed-wheel, and Fig. 4 represents a perspective view of one of the notched braces, which are placed inside of the seed-wheel.

In the accompanying drawings, A represents a triangular skeleton harrow-frame, having harrow-teeth $a$ $a$ and suitable handles B B. Between the inclined bars of the harrow-frame is situated a polygonal-shaped seed-wheel, C, which is composed of two heads, having strips connected to the edges of the same, so as to close the space on the exterior, excepting a central circumferential opening, $m$, for the exit of the seed. The heads of the wheel are connected together and braced by a series of bars, G, placed equidistant, each of which has a notch or groove, X, on its outer edges near the center. These bars extend down a short distance toward the center of the wheel.

A suitable door is formed on the periphery of the wheel to allow the seed to be placed in the same.

D represents a flange or ring, extending entirely around the wheel on its exterior, and near the circumferential opening $m$ in said wheel. This flange acts as a driving wheel or roller, and rests on the ground, to cause the wheel to rotate as the harrow is drawn forward.

The wheel C is provided with a central shaft, $a$, extending through the heads of the wheel or box, whereby, by means of a bail or rods, E E, hinged to the forward part of the harrow-frame, and hinged to the ends of the shaft, said wheel has a free up-and-down movement, and the wheel or seed-box being thus adjustable, the seed in the box is distributed with regularity and precision, whether over rough or smooth ground. One side of the bail E, after being wrapped around the shaft $a$, is extended to the rear of the wheel, and bent as shown, so that one prong, $b$, will enter the opening $m$ of the wheel, for the purpose of regulating the flow of the seed therefrom.

In the front of the frame A is a furrow-opener, H, placed directly in the rear of the harrow-blade $h$.

In operating, the wheel is filled with seed and the harrow drawn forward, so that the wheel revolves and drops the seed in the furrow.

Having thus fully described my invention, what I claim as new, and desire to secure by Letters Patent, is—

The combination of the harrow-frame A, wheel C, with notched interior braces G, flange D, and opening $m$, hinged bail E, and the regulator $b$, formed upon one prong of the bail, all constructed and arranged substantially as and for the purposes set forth.

In testimony that I claim the foregoing I have hereunto set my hand this 27th day of April, 1876.

JAS. A. BRENT, JR.

Witnesses:
 H. N. TYLER,
 W. T. MATHMY.